(12) United States Patent
Tenhunen (10) Patent No.: US 7,353,015 B1
(45) Date of Patent: Apr. 1, 2008

(54) METHOD AND A DEVICE FOR ERASING A NOTIFICATION MESSAGE

(75) Inventor: Jouko Tenhunen, Helsinki (FI)

(73) Assignee: Nokia Corporation, Espoo (FI)

( * ) Notice: Subject to any disclaimer, the term of this patent is extended or adjusted under 35 U.S.C. 154(b) by 429 days.

(21) Appl. No.: 09/696,646

(22) Filed: Oct. 25, 2000

(30) Foreign Application Priority Data

Oct. 28, 1999 (FI) .................................. 19992330

(51) Int. Cl.
*H04M 1/663* (2006.01)
*H04M 1/725* (2006.01)
*H04Q 7/22* (2006.01)

(52) U.S. Cl. .............................. 455/412.2; 455/412.1; 379/88.12

(58) Field of Classification Search ................ 455/412, 455/413, 466, 412.1, 412.2; 379/88.11, 88.27, 379/88.12, 88.22–88.26
See application file for complete search history.

(56) References Cited

U.S. PATENT DOCUMENTS

| | | | | |
|---|---|---|---|---|
| 5,177,780 | A | | 1/1993 | Kasper et al. ................ 379/59 |
| 5,944,786 | A | * | 8/1999 | Quinn ......................... 709/206 |
| 6,014,559 | A | * | 1/2000 | Amin .......................... 455/413 |
| 6,047,272 | A | * | 4/2000 | Biliris et al. ................ 705/400 |
| 6,175,858 | B1 | * | 1/2001 | Bulfer et al. ............... 709/206 |
| 6,246,871 | B1 | * | 6/2001 | Ala-Laurila ................ 455/413 |
| 6,333,973 | B1 | * | 12/2001 | Smith et al. ............... 379/88.12 |
| 2002/0006781 | A1 | * | 1/2002 | Narusawa ................... 455/412 |

FOREIGN PATENT DOCUMENTS

| | | |
|---|---|---|
| EP | 0876043 A2 | 11/1998 |
| WO | WO 96/25817 | 8/1996 |
| WO | WO 98/46034 | 10/1998 |
| WO | WO 99/31864 | 6/1999 |

OTHER PUBLICATIONS

European Telecommunication Standard, ETS 300 901, "Digital Cellular Telecommunications System (Phase 2+); Technical Realization Of The Short Message Service (SMS); Point-To-Point (PP)", GSM 03.40, version 5.8.1. 1996.

* cited by examiner

*Primary Examiner*—Matthew Anderson
*Assistant Examiner*—Eugene Yun
(74) *Attorney, Agent, or Firm*—Perman & Green, LLP (57) ABSTRACT

The object of the invention is a method for erasing a notification message in a terminal, which terminal communicates with a network over a radio interface. The method comprises storing a specific first information in a system outside the terminal, and transmitting a notification message to the terminal over said radio interface as a sign of said storing. Said notification message is stored in a memory of the terminal. The method comprises contacting from the terminal a specific address for gaining access to said first information and erasing said notification message from the memory of the terminal in response to a specific procedure relating to said contacting. The object of the invention is also a terminal, which implements a method according to the invention.

41 Claims, 3 Drawing Sheets

METHOD AND A DEVICE FOR ERASING A NOTIFICATION MESSAGE

FIELD OF THE INVENTION

The present invention relates a Voice Mail System (VMS) and other corresponding systems where messages, such as voice messages, faxes and electronic mail messages can be stored for a recipient of a call or message who could not be reached. In particular, the invention relates to the erasure of the notification message transmitted from a voice mail system to a recipient that was transmitted to a recipient who could not be reached, as a sign of the message stored in the system. Furthermore, the invention also relates quite generally to the erasure of notification messages in a terminal.

BACKGROUND OF THE INVENTION

Nowadays, it is possible to use in many telephone networks a so-called answering service. In this case, it is possible for a person calling to leave a short voice message to a recipient who cannot be reached at the moment the call is made. For each user of an answering service, there exists in a memory of a voice mail system a voice mailbox of his own, wherein the voice messages intended for each user are stored. If the recipient of a call does not answer the call, a telephone operator or some other unit responsible for the maintenance of a voice mail system responsible for the switching of voice messages will answer the call; request the caller to leave a voice message to the person he is trying to reach; receive the voice message dictated by the caller; and store it in a memory in a digital format in the voice mailbox of the person who could not be reached. When the person for whom the call directed to the voice mail system was intended, next time contacts the voice mail system, for example, with his mobile station, the system will read from the memory the stored voice message and send it in an electronic format to the terminal of said person, such as to a mobile station of a cellular network, which will repeat the voice message transmitted in an electronic format as speech. Here, by the terminal is meant all terminals suitable for processing voice data, such as mobile stations, phones of a public switched telephone network (PSTN), and computer terminals that are connected to a telephone network.

A voice mail system differs from a conventional telephone answering set in that the installations and functions of a voice mail system are centralised in a telephone network, whereas a conventional telephone answering device is located decentralised in connection with a user's terminal.

Most voice mail systems VMS according to prior art (FIG. 1) send a notification message to a person who could not be reached of the fact that a voice message has been left for the person in question in the voice mail system as is presented in the patent applications WO 98/46034 and EP 0 876 043 (A2). In addition to voice messages an SMS message sent to a mobile station, can be a notification of a fax stored for the recipient in a network. Faxes sent to a recipient who could not be reached are typically stored in a fax mailbox corresponding to a voice mailbox, which can be integrated in connection with the voice mailbox so that both of these boxes even have the same telephone number. An SMS message sent to a mobile station can also be a notification of an electronic mail message or other corresponding message stored for the recipient in a network. Electronic mail messages that come into question in connection with the present invention are typically stored in a network at a Remote Mail Server (RMS) from where a notification message as a sign of the storing of a new electronic mail message can be transmitted to a mobile station as a SMS message of a cellular network. Hereinafter in the present description, a voice message will be used as an example of said messages stored for a user in a network.

Figure 1:
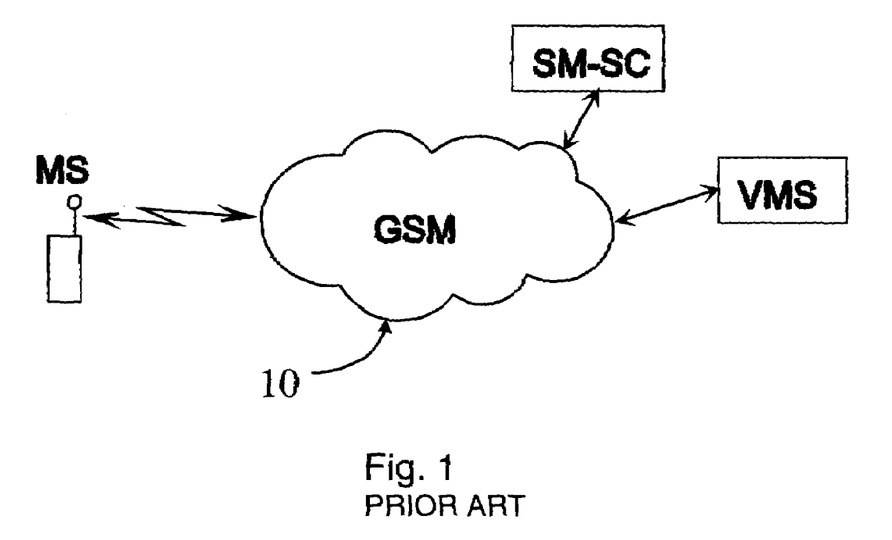
FIG. 1 shows a voice mail system according to prior art in a mobile communication network.

If the question is of a voice mail system VMS located in a wireless cellular network 10, e.g. in a GSM network (Global System for Mobile Communications) a notification of the existence of a voice message is typically transmitted through the short message service (SMS) of the cellular network 10. The notification of the fact that there is a voice message waiting in the voice mail system VMS for a recipient who could not be reached, is typically sent in this case by a mobile phone operator as an SMS message of the cellular radio network to the mobile station MS of the recipient who could not be reached. In practice, in this case, the voice mail system VMS takes the initiative in transmitting the SMS message, but the transmission of the short message is effected through a short message service centre SM-SC of the network. Hereinafter in the present description, a GSM network will be used as an example of a cellular network comprising a voice mail function.

A notification of a voice message that is waiting in a voice mail system is transmitted to a recipient who could not be reached always when a new voice message is stored in the voice mail system. More typically, always when a new voice message is stored in the voice mail system, the information on the number of new, not yet listened voice messages is sent to the recipient. Also the information on the total number of stored messages can be transmitted. After obtaining the notification, the recipient can contact the voice mail system by calling the number of a voice mailbox of the voice mail system, in which voice mailbox the voice messages intended for the recipient are stored. After the establishment of the connection, the recipient may listen to the voice messages and carry out specific procedures to them, such as store or erase them.

If a plurality of voice messages are stored in a voice mailbox (the number can be, e.g. ten), an equal number of SMS messages were sent to a recipient who could not be reached, to a mobile station as a notification of the existence of the voice messages. These SMS messages (notification messages) will remain stored in the mobile station's memory until the recipient, i.e. the user of the mobile station erases them from the memory manually one at a time. This is inconvenient and consumes a lot of the user's time.

In some advanced mobile stations, such as in a Nokia 6110 mobile station and in a Nokia 9110 Communicator mobile station, all ten SMS messages mentioned in the previous chapter are not stored in different memory locations in the memory of a mobile station, but when a new SMS message as a sign of the existence of a new voice message arrives at the mobile station, an old message can be replaced by the new message. Typically, the number of new, not yet listened voice messages stored for the recipient appears from the content of the message. In this case, instead of ten messages, the user only has to erase manually one SMS message. This means, however, additional trouble to the user of the mobile station.

In addition to a voice mail system and a remote mail server, notification messages can also come to a terminal from other addresses. A plurality of notification messages can come, for example, from many different bearer services that a user has ordered. Thus, the erasure of many such notification messages from the memory of a mobile station is inconvenient and consumes a lot of the user's time.

SUMMARY OF THE INVENTION

Now, a method and a device have been invented for facilitating the use of a mobile station. According to one aspect of the invention, there is implemented a method for erasing a notification message in a terminal, which terminal communicates with a network over a radio interface, which method comprises:

storing a specific first information in a specific system outside the terminal; transmitting to the terminal over said radio interface a notification message as a sign of said storing;

storing said notification message in a memory of the terminal.

It is characteristic of the method that it comprises:

contacting from the terminal a specific address for gaining access to said first information;

erasing from the memory of the terminal said notification message in response to a specific procedure relating to said contacting.

Said first information can be, for example, a voice message stored for a user in a voice mail system; a fax stored in the user's fax mailbox; a multimedia message stored in a multimedia messaging system; or an electronic mail message intended for the user, stored in a remote mail server. Said first information can also be some information relating to a bearer service ordered by the user, of the storing of which information a notification message is sent to the user's terminal. In this case, said first information is not necessarily only intended just for the user in question. Said first information can be, for example, the information about the changing of the URL (Uniform Resource Locator) of some page in the Internet network of which there is a desire to inform the terminal. Said first information can also be the information about a change in stock exchange prices, a delayed airplane, an advertisement, a hit piece of music or a ringing tone stored in a network server that can be retrieved into a terminal.

The address, which is contacted from the terminal for gaining access to said first information can be, e.g. a telephone number, whereupon said contact, which can be, e.g. a call or a data call is made by calling said number from the terminal, e.g. for gaining access to a voice message, a fax or an electronic mail message. Said address can also be some other address, e.g. URL, such as http://www.company-xyz-.com or some other IP (Internet Protocol) address by contacting of which access is gained, e.g. with the help of WAP (Wireless Application Protocol) to a network server where a new ringing tone, flight schedules or stock exchange quotations are maintained or stored.

The contact that is made from the terminal to said address can be a circuit or packet switched connection. In connection with the present description, by contact is meant contact that can be implemented either as connection oriented or connectionless service. In connection oriented contacting, first a given connection link is established between the communicating parties before actual data transmission can be effected. In connectionless contacting, no connection link need to be established, but data transmission can be effected immediately. An example of this is the SMS message of a GSM network.

By the procedure relating to contacting in response to which a notification message is erased, is meant, for example, the initiation of contacting, the establishment of contact or disconnecting an established contact. If there are in the memory of the terminal more than one notification messages arrived from the system in question, all such notification messages will be erased in response to a procedure relating to said contacting.

According to a second aspect of the invention, there is implemented a terminal, which is arranged to communicate with a network over a radio interface and which terminal comprises means for receiving a notification message transmitted to the terminal over said radio interface and for storing it in a memory of the terminal, which notification message is a notification of a first information stored in a system outside the terminal.

It is characteristic of the terminal that it comprises: means for contacting a specific address for gaining access to said first information;

means for erasing said notification message from the memory of the terminal in response to a specific procedure relating to said contacting.

According to one preferred embodiment of the invention, a terminal which can be, for example, a mobile station of a cellular network or a computer terminal that is connected to a telecommunication network (telephone network) over a radio interface (e.g. through the mobile station of the cellular network), checks when a call is made from the terminal whether the call is made (whether contact is made) to a number, which makes the call connect to a system outside the terminal, wherein specific messages, such as voice messages, video recording messages or other multimedia messages, faxes or electronic mail messages intended for the user are being stored. If this happens, the notification messages that were transmitted from the system outside the terminal as, e.g. an SMS message or a WAP message to the terminal as a notification of the existence of said specific messages will be automatically erased from the terminal's memory by which here is meant a memory that is in the use of the terminal. By the system outside the terminal is meant here, e.g. a voice mail system, a video recording message system or a multimedia messaging system, a remote mail server, a fax mailbox service or other corresponding system or network server, wherein some content is stored in an electronic format, whereto the terminal can gain access.

BRIEF DESCRIPTION OF THE DRAWINGS

In the following, the invention will be described in detail by referring to the enclosed drawing, in which.

DETAILED DESCRIPTION

Figure 2:
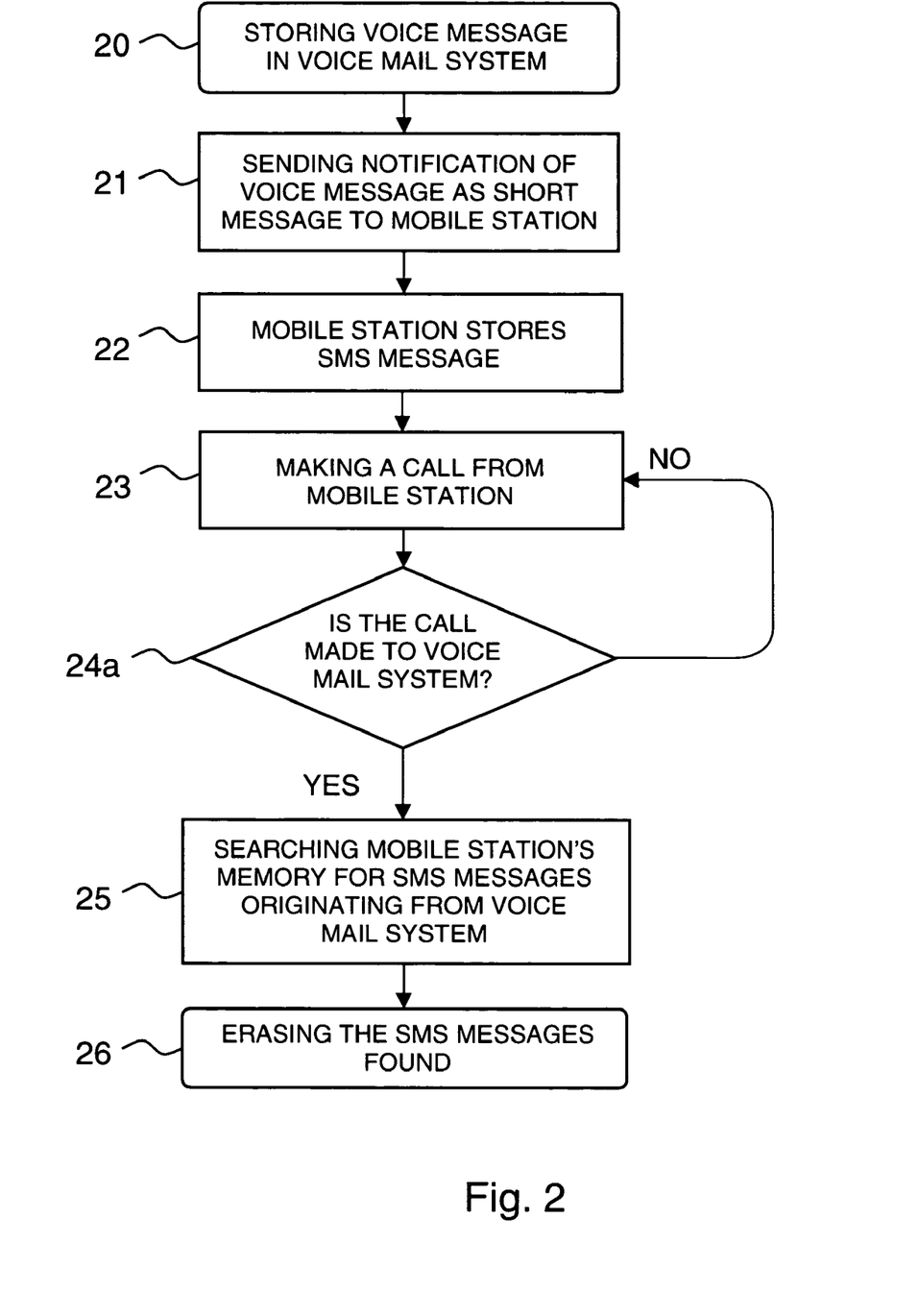
FIG. 2 is a flow diagram that shows the basic idea of the invention relating to a preferred embodiment of the invention.
Figure 3:
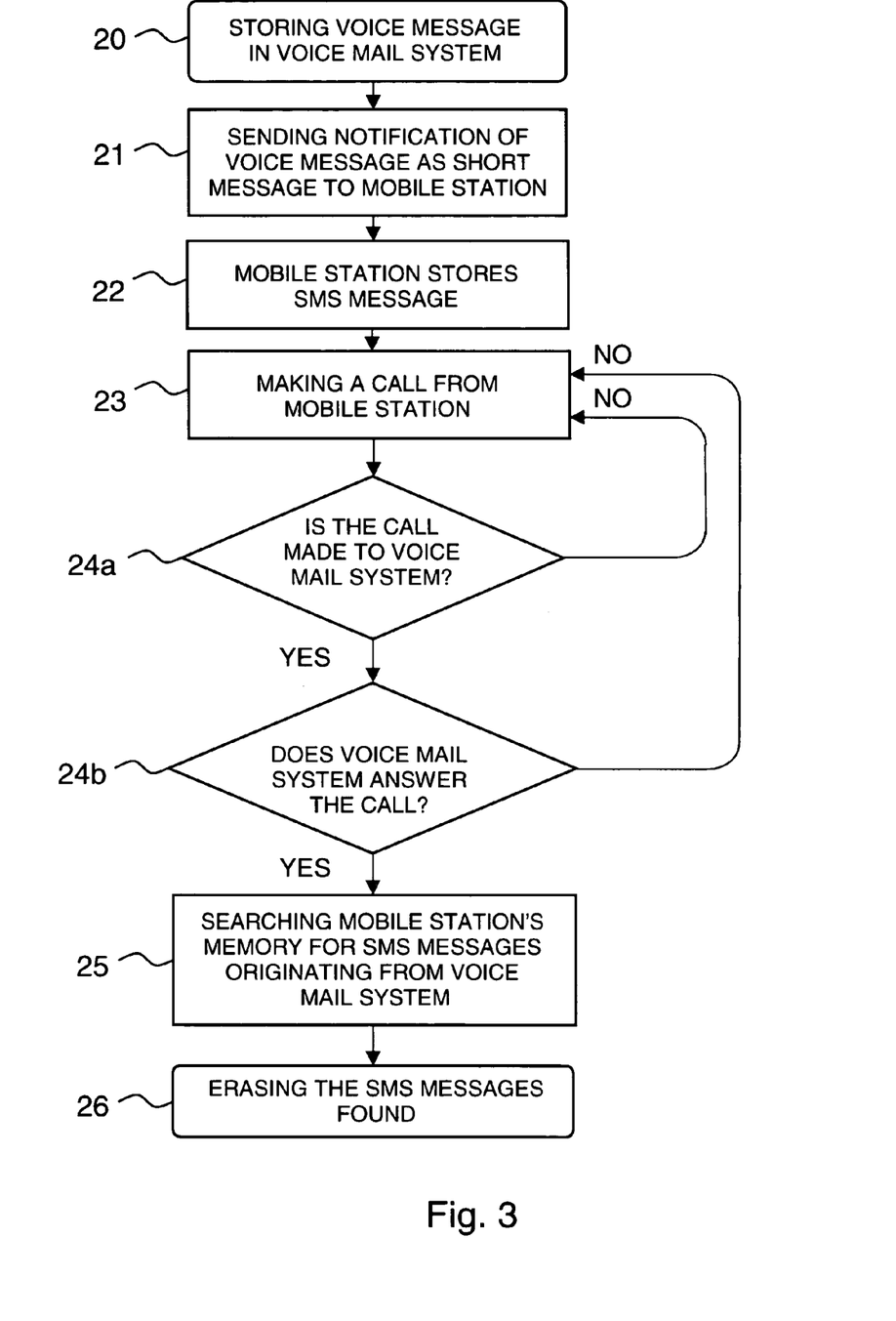
FIG. 3 is a flow diagram that shows an alternative decision-making method according to the invention.

FIG. 1 was described above in connection with the description of prior art. FIG. 2a is a flow diagram that shows the basic idea of a method according to the invention relating to one preferred embodiment of the invention. In the first phase of the method, a voice mail system stores a voice message for a recipient who could not be reached (Block 20). A notification of this is transmitted to a mobile station of the recipient who could not be reached (Block 21). The mobile station stores the SMS message in its memory (Block 22). The memory used can be located in the mobile station itself, in a SIM card (Subscriber Identity Module) or in some other separate memory means, such as in a MultiMedia Memory Card (MMMC). When a call is made from the mobile station next time (Block 23), the mobile station will check if the call is made to a personal voice mailbox of the user of the mobile station (Block 24a). If this is not the case, it will be moved back to Block 23. If again the call is made to the user's personal voice mailbox, the mobile station will search among the SMS messages stored in the memory for those that originate from the voice mail system (Block 25) and erase them (Block 26). Alternatively, as is shown in FIG. 3, the SMS messages that originate from the voice mailbox can be erased only after the voice mail system has answered the user's call. In this case, it will be moved from Block 24a to Block 24b, where the mobile station checks whether the voice mail system answers the call. If the voice mail system does not answer the call, it will be moved back to Block 23, and the SMS messages are not erased. If the voice mail system answers, the mobile station will search among the SMS messages stored in the memory for those that originate from the voice mail system (25) and erase them (Block 26).

The number of the personal mailbox of the user of the mobile station can be stored in the mobile station either in the memory of the SIM card or in the memory of the mobile station. Typically, the storing is carried out by the user of the mobile station in connection with the commissioning of the mobile station. If the number of the voice mailbox stored in the memory is correct, the same number also shows as the number of the sender in the SMS message that is transmitted on the initiative of the voice mail system to the mobile station as a notification of a voice message waiting in the voice mail system. More accurately, the number of the voice mailbox shows in the transmitted SMS message as a so-called Calling Line Identity (CLI). The number data can also be added to the user data of the SMS message. In this case, the content of the user data can be, for example: "1 message. Call +358421234567", where the series of numbers is the number of the user's voice mailbox. Typically, the initiative in transmitting the SMS message is taken by the voice mail system VMS. Typically, the SMS message is switched to the mobile station through the short message service centre of the network.

In order to illustrate a first preferred embodiment of the invention, it is assumed that the user of a mobile station has been at a meeting that has lasted for four hours during which time he has been unable to answer his mobile phone. It is further assumed that during this time a plurality of calls have come to his mobile phone, which have been directed to a voice mail system. It is still further assumed that as a result of the unanswered calls directed to the voice mail system, four voice messages have been stored in the personal voice mailbox of the user of the mobile phone. As a notification of this, four SMS messages have typically been sent to the user's mobile station, in which messages the calling line identity is the number of the user's voice mailbox. It should be noted here that said notification to the mobile station can also be transmitted as a WAP message or other corresponding message, such as a message over a packet switched connection (e.g. in GPRS service (General Packet Radio Service)).

When the user of the mobile station begins to use his mobile station after the meeting, he notices the SMS messages sent on the initiative of the voice mailbox. When he wants to listen to his voice messages stored in the voice mailbox, the user of the mobile station contacts his voice mailbox by calling the number of his voice mailbox. Selecting the number of the voice mailbox can be effected, for example, by keying in the number manually with the mobile station's numeric keypad or by pressing the shortcut key of the mobile station on which the number is stored, by selecting the number from the mobile station's menu facilities or by picking up the number from a SMS message by the function "Pick up Number". Correspondingly, when wanting to gain access to the faxes stored in a fax mailbox that corresponds to a voice mailbox, for a user who could not be reached, the user typically calls the number of his fax mailbox. Whereas the retrieving of electronic mail messages stored for a user in a remote mail server or a video recording message system may be effected using a circuit or packet switched connection.

According to the invention, a mobile station comprises means for identifying calls that terminate at a user's personal voice mailbox. Calls made to a voice mailbox are identified by comparing always when calling from the mobile station, the number to which the call is made to the number of the user's personal voice mailbox stored in the memory of the mobile station (or in the memory of the SIM card). Typically, comparing is carried out by a specific process in a computer program run in the mobile station.

In some mobile communication networks, a user can contact this personal voice mailbox by calling a specific number, which is the same irrespective of the user. For example, in the GSM network of Radiolinja in Finland, a user contacts his own voice mailbox (answering service) from his own mobile station by dialing the number 777. Typically, the network uses here the CLI data for identifying the user and redirects the call dialed to the number 777 to the personal voice mailbox of the user.

In order that a call terminating at a voice mail system could be identified, a user may according to the invention also input menu controlled other numbers of a voice mailbox than said voice mailbox number mentioned in the previous chapter, through the user interface of a mobile station into the mobile station's memory. Also these numbers are always compared when making a call from the mobile station to the number called for identifying the calls terminating at the user's voice mailbox. Hence, here all telephone numbers by calling of which a call will terminate at a user's personal voice mailbox are understood as numbers of the voice mailbox.

If the number called is the same as one of the numbers of the voice mailbox mentioned above, the mobile station concludes that the call will terminate at the user's personal voice mailbox. This conclusion the mobile station makes so that it interprets that the call will terminate at the user's personal voice mailbox irrespective of whether the call is made with or without a country code (e.g. Finland +358). Thus, for example, when making a call within the Finnish borders both to the number +358 50 123456 (with the country code) and when calling 050 123456 (without the country code), the call is interpreted to terminate at the user's personal voice mailbox irrespective of which number is stored in the mobile station as the number of the voice mailbox (assuming, of course, that the number is question really is the number of the user's voice mailbox). After this, the short messages transmitted to the mobile station on the initiative of the voice mail system are identified by comparing the CLI data of the SMS messages to the numbers of the voice mailbox stored in the mobile station. After the identification phase, the identified SMS messages that were transmitted to the mobile station on the initiative of the voice mail system as a sign of the existing voice messages, are erased from the memory of the mobile station.

Alternatively, the SMS messages originating from the voice mailbox can be erased only after the voice mail system (user's own voice mailbox) has answered the user's call. The mobile station knows that the voice mail system has answered the call if it receives a specific answer message in signaling between the network and the mobile station. In this case, the SMS messages can be erased after the arrival of said specific answer message. According to the invention, it is also possible to erase the SMS messages in response to disconnecting the call (contact).

If the number which is called with the mobile station is not the number by calling of which the call will terminate at the user's voice mailbox, the erasing procedures of SMS messages will not be carried out.

Depending on the mobile communication network and the operator, however, CLI data is not always delivered along with a SMS message. This being the case, the identification of the short messages transmitted to a mobile station on the initiative of a voice mail system will not succeed merely by comparing the CLI data. However, often the user data of a SMS message, which can be, for example, 160 characters long, comprises such data from which it can be concluded that the short message originates from a voice mail system. Such data can be, for example, the number of a voice mailbox or some other details relating to the structure of the text comprised by the short message.

In a second preferred embodiment according to the invention, in order to facilitate the identification of short messages originating from a voice mail system, there is provided means for a user of a mobile station for creating a file of his own in the memory of the mobile station. The user may input menu controlled into the memory of the mobile station, through the user interface of the mobile station, a specific type of reference file.

This file should be as identical as possible in structure to the operator-specific content of the user data of a SMS message transmitted from a voice mail system as a sign of the existence of voice messages. In this case, when comparing the content of said reference file to the content of short messages sent to the mobile station, the SMS messages transmitted on the initiative of a voice mail system can be identified as well as possible. For instance, if a user of a mobile station uses the answering service of the Finnish Radiolinja, the content of the reference file can be, for example, as follows:

Message to Pro Box %d clo %t. Voice:%v & Fax:%f. Call %p, where "Message to Pro Box" is an operator-specific standard text for a SMS message transmitted on the initiative of a voice mail system; %d is the leaving date of the message; %t is the leaving time of the message; %v is the number of voice messages stored in the system; %f is the number of faxes stored in the system; and %p is the telephone number of the user's voice mailbox.

Now, in case it has been impossible to define the notification messages originating from a voice mail system with the means presented in connection with the first embodiment of the invention, of the SMS messages stored in the mobile station the messages that originate from a voice mail system can be identified by comparing specific points in the content of their user data to the content of the reference file. For example, it is possible to compare the text "Message to Pro Box"; the words "clo", "Voice", "Fax", "Call"; and the voice mailbox number % p. In the comparison, the "Pick up Number" function can be utilised.

Correspondingly, a reference file which can be used for the identification of an operator-specific notification message, which notification message is transmitted as a sign of the storing of a new mobile station ringing tone stored in a specific network server, can be of the format:

New Ringing Tone: Name% URL%, where Name% is the name of the new ringing tone and URL% is the URL from which the new ringing tone can be retrieved. When comparing the content of the reference file to the actual notification message, it is possible to make use of the "Pick up URL" function which is known, e.g. from a Nokia 9110 Communicator mobile station.

According to the invention, a user is also provided with means for modifying said reference file. This may be necessary if the network operator changes the basic structure of the user data of the above-mentioned SMS message sent from a voice mail system as a sign of the existence of voice messages.

An SMS message comprises in its message structure, in addition to user data, also so-called control bits. In connection with GSM, there is known a control bit pattern (for example, "000 0000") in the message structure of an SMS message from which a mobile station can determine that the SMS message arrived at the mobile station is a notification originating from a voice mail system, of a voice message stored for a recipient in the voice mail system. Therefore, in a third embodiment according to the invention, the control bit pattern presented above is preferably used in the identification of SMS messages originating from a voice mail system. This being the case, always when the user calls successfully his voice mailbox, the mobile station erases from the mobile station's memory the SMS messages that have the above-mentioned control bit pattern in their message structure.

The invention can be implemented programmably. The computer program in question can be stored in a data medium, for example, in a memory; it can be transferred; and it can be run, e.g. in a computer or a microprocessor of a mobile phone.

The advantage gained with the arrangement according to the invention is that in addition to programmable changes made in a mobile station, there is no need to make changes in a cellular network, a voice mail system, interfaces and signaling, for implementing the invention.

Figure 4:
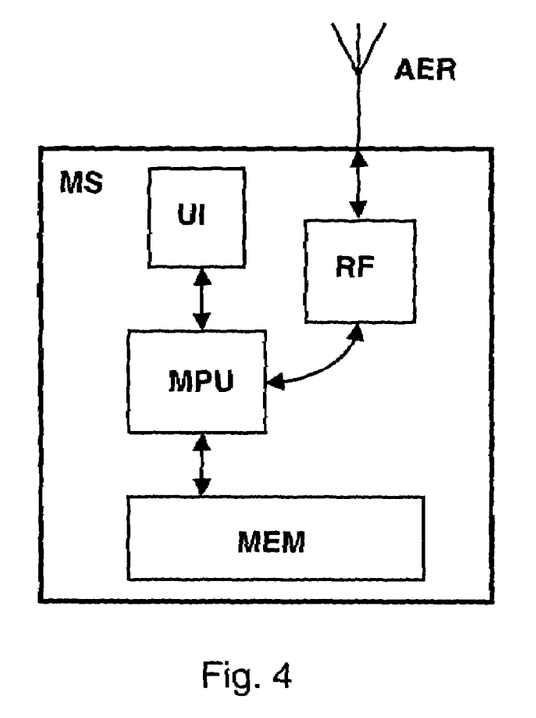
FIG. 4 illustrates essential parts of a mobile station that implements a method according to the invention.

FIG. 4 illustrates parts essential for the operation of a mobile station (MS) that implements a method according to the invention. The mobile station MS comprises a processor MPU and parts functionally connected to the processor: a memory MEM; a user interface UI; and a radio part RF. The processor MPU is preferably a microprocessor, -controller or a digital signal processor (DSP). The memory MEM preferably comprises a non-volatile memory (ROM, read only memory) and a random access memory (RAM). The radio part RF can transmit and receive radio frequency signals with its antenna AER. The user interface UI preferably provides a user with a display and a keypad for using the mobile station MS. Typically, the software of the mobile station MS is stored in the non-volatile memory. The processor MPU controls on the basis of the software, the operation of the mobile station MS, such as the use of the radio part RF; the presentation of messages with the user interface UI; and the reading of inputs received from the user interface UI. The processor MPU uses the random access memory as a buffer memory when processing data. In the mobile station, a method according to the invention (e.g. comparing telephone numbers and erasing SMS messages) is substantially implemented by the processor MPU on the basis of the program making use of the memory MEM.

This paper presents the implementation and embodiments of the present invention with the help of examples. A person skilled in the art will appreciate that the present invention is not restricted to details of the embodiments presented above, and that the invention can also be implemented in another form without deviating from the characteristics of the invention. The embodiments presented above should be considered illustrative, but not restricting. Thus, the possibilities of implementing and using the invention are only restricted by the enclosed claims. Consequently, the various options of implementing the invention as determined by the claims, including the equivalent implementations, also belong to the scope of the invention.

The invention claimed is:

1. A method for erasing a notification message in a terminal, which terminal communicates with a network over a radio interface, which method comprises:
   storing a specific first information in a specific system outside the terminal, said notification messages having a specific address that identifies a location of the stored specific first information;
   transmitting to the terminal, over said radio interface, a notification message as a sign of said storing;
   storing said notification message in a memory of the terminal,
   contacting from the terminal said specific address for gaining access to said first information based on said notification message; and
   automatically erasing from the memory of the terminal said notification message in response to a specific procedure relating to said contacting.

2. A method according to claim 1, wherein said first information to which information said terminal gains access is stored in the specific system outside the terminal, for said terminal.

3. A method according to claim 1, wherein said first information is a message intended for the terminal, which is stored for the terminal in an electronic format in the specific system outside the terminal.

4. A method according to claim 3, wherein said message intended for the terminal is one of the following: voice message; video recording message; multimedia message; fax; and electronic mail message.

5. A method according to claim 1, wherein said specific procedure in response to which said notification message is erased, is one of the following: initiation of contacting said specific address; establishment of contact; and disconnecting.

6. A method according to claim 1, wherein the method further comprises:
   storing in the memory of the terminal said specific address by contacting of which contact is made to said system outside the terminal;
   checking in the terminal when contact is made from the terminal, whether the address which is contacted is said specific address, by comparing the address which is contacted to said specific address stored in the terminal; and
   if the address which is contacted is said specific address, identifying from among the messages stored in the memory of the terminal the notification messages that originate from said system outside the terminal and erasing the identified notification messages.

7. A method according to claim 1, wherein contacting from the terminal said specific address for gaining access to said first information is effected by making a call from the terminal to a specific number; and erasing the notification message is effected in response to one of the following procedures: making a call to said specific number, said specific system outside the terminal answering the call; and terminating off said call.

8. A method according to claim 7, wherein the method further comprises:
   storing in the memory of the terminal said specific number by calling of which the call will connect to said system outside the terminal;
   checking when making a call from the terminal, whether the number which is called is said specific number by comparing the number which is called to said specific number stored in the terminal; and
   if the number which is called is said specific number, identifying from among the messages stored in the memory of the terminal the notification messages that originate from said system outside the terminal, and erasing the identified notification messages.

9. A method according to claim 8, wherein there are at least two said specific numbers by calling of which the call will connect to said system outside the terminal.

10. A method according to claim 8, wherein said identification of notification messages is carried out by comparing the CLI data (Calling Line Identity) of the messages stored in the memory of the terminal to said specific number stored in the terminal.

11. A method according to claim 8, wherein the method further comprises:
   storing in advance in the memory of the terminal a reference file, which is for its essential parts identical to said notification message stored in the memory of the terminal; and
   said identified of notification messages is carried out by comparing the content of the messages stored in the memory of the terminal to the content of said reference message.

12. A method according to claim 1, wherein said notification message transmitted to and stored in the terminal comprises a message structure and in its message structure, a control bit pattern, which control bit pattern is used for identifying notification messages originating from the system outside the terminal.

13. A method according to claim 1, wherein said system outside the terminal is one of the following: voice mail system; video recording message system; multimedia messaging system; fax mailbox service; remote mail service.

14. A method according to claim 1, wherein said notification message is one of the following: SMS message; WAP message; and message according a packet switched protocol.

15. A method according to claim 1, wherein said terminal is one of the following: telephone of a cellular network; and computer terminal.

16. A method according to claim 1, wherein:
   said first information is a message intended for the terminal, which is stored for the terminal in an electronic format in the specific system outside the terminal;
   said message intended for the terminal is one of the following: voice message; video recording message; multimedia message; fax; and electronic mail message; and
   said notification message is of a type selected from a group of different types and corresponding to the type of message intended for the terminal.

17. The method of claim 1 further comprising erasing all notification messages from the memory of the terminal in response to gaining access to the first information when more than one notification messages are stored.

18. The method of claim 1 further comprising receiving an answer message in the terminal that indicates that the first information is accessed prior to enabling the erasing of the notification message in the terminal.

19. The method of claim 1 wherein erasing the notification message occurs only after an answer message is received in the terminal indicating that the first information is accessed and access to the first information is terminated.

20. A terminal for communicating with a network over a radio interface, which terminal comprises:
    apparatus for receiving a notification message over said radio interface, said notification message having a specific address, which notification message is a notification of a first information stored in a system outside the terminal and accessible to the terminal via said specific address with which the notification message is associated,
    a memory for storing the notification message;
        apparatus for contacting the specific address for gaining access to said first information based on said notification message; and
        apparatus for automatically erasing said notification message from the memory in response to a specific procedure relating to said contacting.

21. A terminal according to claim 20, wherein said memory is located in one of the following: the terminal itself and a separate memory.

22. A terminal according to claim 20, wherein said first information is a message intended for the terminal, which is stored for the terminal in an electronic format in the specific system outside the terminal.

23. A terminal according to claim 22, wherein said message intended for the terminal is one of the following: voice message; video recording message; multimedia message; fax; and electronic mail message.

24. A terminal according to claim 20, wherein said specific procedure in response to which said notification message is erased, is one of the following: initiation of contacting said specific address; establishment of contact; and disconnecting.

25. A terminal according to claim 20, wherein the memory is further configured to store concurrently a plurality of notification messages and respective specific addresses; and the terminal further comprises:
    apparatus for determining when contact to any of said specific addresses is made or is being made;
    apparatus for identifying from among the plurality of notification messages stored in the memory any notification messages corresponding to such a specific address for which the contacting is determined; and
    the memory is configured to erase any identified notification messages.

26. A terminal according to claim 20, further comprising apparatus for making a call from the terminal to a specific number in order to contact said specific address for gaining access to said first information; and
    the memory is configured to erase the notification message in response to one of the following procedures: making a call to said specific number, said specific system outside the terminal answering the call; and terminating off said call.

27. A terminal according to claim 26, wherein:
    the memory is further configured to store said specific number by calling of which the call will connect to said system outside the terminal;
    the terminal further comprises apparatus for checking when making a call from the terminal whether the number which is called matches with said specific number by comparing the number which is called to said specific number stored in the terminal; and
    apparatus for identifying from among the messages stored in the memory of the terminal the notification messages that originate from said system outside the terminal and erasing the identified notification messages, if the number which is called matches said specific number.

28. A terminal according to claim 27, wherein there are at least two of said specific numbers are associated with said system outside the terminal.

29. A terminal according to claim 26, wherein:
    the memory is further configured to store in advance a reference file that for its essential parts equals to said notification message stored in the memory; and
    the apparatus for identifying the notification messages that originate from said system outside the terminal is configured to carry out said identification of notification messages by comparing the content of the messages stored in the memory of the terminal to the content of said reference message.

30. A terminal according to claim 20, wherein said notification message comprises a message structure and the message structure comprises, a control bit pattern, which control bit pattern suitable for identifying notification messages originating from the system outside the terminal and wherein the terminal is capable of identifying such notification messages originating from the system outside the terminal based on the control bit pattern.

31. A terminal according to claim 20, wherein said system outside the terminal is one of the following: voice mail system; video recording message system; multimedia messaging system; fax mailbox service; and remote mail service system.

32. A terminal according to claim 20, wherein said notification message is one of the following: SMS message; WAP message; and a message according a packet switched protocol.

33. A terminal according to claim 20, wherein said terminal is one of the following: telephone of a cellular network; and computer terminal.

34. A terminal according to claim 20, wherein:
    said first information is a message intended for the terminal, which is stored for the terminal in an electronic format in the specific system outside the terminal;
    said message intended for the terminal is one of the following: voice message; video recording message; multimedia message; fax; and electronic mail message; and
    said notification message is of a type selected from a group of different types and corresponding to the type of message intended for the terminal.

35. A computer program for controlling a terminal having a memory, said terminal capable of communicating with a network over a radio interface, said notification message having a specific address, comprising:
    computer executable program code for causing the terminal to receive a notification message over said radio interface, which notification message is a notification of a first information stored in a system outside the terminal and accessible to the terminal via said specific address with which the notification message is associated;

computer executable program code for causing the terminal to store the notification message;

computer executable program code for causing the terminal to contact the specific address for gaining access to said first information based on said notification message; and computer executable program code for causing the terminal to automatically erase said notification message from the memory in response to a specific procedure relating to said contacting.

36. A computer program according to claim 35, further comprising:

computer executable program code for causing the terminal to store concurrently a plurality of notification messages and respective specific addresses;

computer executable program code for causing the terminal to determine when contact to any of said specific addresses is made or is being made;

computer executable program code for causing the terminal to identify from among the plurality of notification messages stored by the terminal any notification message corresponding to such a specific address for which the contacting is determined; and computer executable program code for causing the terminal to erase any identified notification messages.

37. A computer program according to claim 35, further comprising:

computer executable program code for causing the terminal to make a call from the terminal to a specific number in order to contact said specific address for gaining access to said first information; and computer executable program code for causing the terminal to erase the notification message in response to one of the following procedures; making a call to said specific number; said specific system outside the terminal answering the call; and terminating of said call.

38. A computer program according to claim 35, further comprising:

computer executable program code for causing the terminal to store in advance a reference file that for its essential parts equals to said notification message stored;

computer executable program code for causing the terminal to compare the content of the messages stored in the memory of the terminal to the content of said reference message in order to identify the notification messages that originate from said system outside the terminal is configured to carry out said identification of notification messages.

39. A computer program according to claim 35, wherein said system outside the terminal is one of the following: voice mail system; video recording message system; multimedia messaging system; fax mailbox service; and remote mail service system.

40. A computer program according to claim 35, wherein said memory is located in one of the following: the terminal itself and a separate memory.

41. A computer program according to claim 35, wherein:

said first information is a message intended for the terminal, which is stored for the terminal in an electronic format in the specific system outside the terminal;

said message intended for the terminal is one of the following: voice message; video recording message; multimedia message; fax; and electronic mail message; and said notification message is of a type selected from a group of different types and corresponding to the type of message intended for the terminal.

* * * * *